United States Patent
Nishikawa

(10) Patent No.: US 10,783,619 B2
(45) Date of Patent: Sep. 22, 2020

(54) IMAGE GENERATING APPARATUS FOR COMBINING PLURAL IMAGES BASED ON DIFFERENT SHUTTER TIMES

(71) Applicant: DENSO CORPORATION, Kariya, Aichi-pref. (JP)

(72) Inventor: Masato Nishikawa, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 9 days.

(21) Appl. No.: 15/793,630

(22) Filed: Oct. 25, 2017

(65) Prior Publication Data

US 2018/0114300 A1 Apr. 26, 2018

(30) Foreign Application Priority Data

Oct. 26, 2016 (JP) ................................. 2016-209732

(51) Int. Cl.
| | | |
|---|---|---|
| G06K 9/40 | (2006.01) | |
| G06T 5/00 | (2006.01) | |
| H04N 5/235 | (2006.01) | |
| H04N 19/182 | (2014.01) | |
| G06T 5/50 | (2006.01) | |

(52) U.S. Cl.
CPC .............. *G06T 5/008* (2013.01); *G06T 5/007* (2013.01); *G06T 5/50* (2013.01); *H04N 5/2355* (2013.01); *H04N 19/182* (2014.11); *G06T 2207/10144* (2013.01); *G06T 2207/20208* (2013.01)

(58) Field of Classification Search
CPC .......... H04N 5/20; H04N 5/374; H04N 19/85; H04N 5/2353; H04N 5/2355; H04N 5/23232; H04N 5/2352; H04N 13/161; H04N 19/98; G06T 5/007; G06T 9/00; G06T 2207/20208; G06K 9/00604; G06K 9/36

See application file for complete search history.

(56) References Cited

U.S. PATENT DOCUMENTS

| 6,204,881 B1 * | 3/2001 | Ikeda ........................ H04N 5/20 348/229.1 |
| 2001/0007473 A1 * | 7/2001 | Chuang .................. H04N 5/235 348/362 |
| 2004/0046875 A1 * | 3/2004 | Itani ...................... H04N 5/2352 348/229.1 |

(Continued)

FOREIGN PATENT DOCUMENTS

| JP | 2009-219042 A | 9/2009 |
| JP | 2011-009834 A | 1/2011 |

(Continued)

*Primary Examiner* — Guillermo M Rivera-Martinez
(74) *Attorney, Agent, or Firm* — Maschoff Brennan

(57) ABSTRACT

In an image generating apparatus, a setter is configured to variably set, for an image capturing task at a next capturing cycle, first and second shutter times and a total gain. The total gain is based on combination of an analog gain and a digital gain. An allocating unit is configured to obtain a threshold gain based on the first and second shutter times and a compression characteristic. The allocating unit is configured to variably allocate the total gain to at least one of the analog gain and the digital gain in accordance with a comparison among the total gain, the threshold gain, and an upper limit for the analog gain.

6 Claims, 7 Drawing Sheets

(56) References Cited

U.S. PATENT DOCUMENTS

| | | | | |
|---|---|---|---|---|
| 2005/0104974 A1* | 5/2005 | Watanabe | H04N 1/6027 | 348/222.1 |
| 2006/0033823 A1* | 2/2006 | Okamura | H04N 5/235 | 348/254 |
| 2007/0242880 A1* | 10/2007 | Stebbings | G06F 21/10 | 382/172 |
| 2008/0055426 A1* | 3/2008 | Pertsel | H04N 5/2351 | 348/223.1 |
| 2008/0101786 A1* | 5/2008 | Pozniansky | H04N 5/2354 | 396/159 |
| 2008/0187235 A1* | 8/2008 | Wakazono | H04N 5/2355 | 382/255 |
| 2009/0027518 A1* | 1/2009 | Kita | G02B 5/284 | 348/231.99 |
| 2009/0086056 A1* | 4/2009 | Asoma | H04N 5/23245 | 348/229.1 |
| 2009/0129695 A1* | 5/2009 | Aldrich | H04N 5/217 | 382/261 |
| 2009/0290045 A1* | 11/2009 | Fukuda | H04N 5/20 | 348/231.99 |
| 2013/0070121 A1* | 3/2013 | Gu | H04N 5/2329 | 348/239 |
| 2013/0271621 A1* | 10/2013 | Lee | H04N 5/232 | 348/222.1 |
| 2013/0329090 A1* | 12/2013 | Ise | H04N 5/2355 | 348/240.99 |
| 2014/0175591 A1* | 6/2014 | Tian | H01L 27/14603 | 257/440 |
| 2014/0218540 A1* | 8/2014 | Geiss | H04N 17/002 | 348/181 |
| 2014/0313387 A1* | 10/2014 | Vogelsang | H04N 5/3696 | 348/308 |
| 2014/0347521 A1* | 11/2014 | Hasinoff | H04N 5/2355 | 348/239 |
| 2015/0054973 A1* | 2/2015 | Velichko | H04N 5/369 | 348/218.1 |
| 2015/0207973 A1* | 7/2015 | Iwasaki | H04N 5/2352 | 348/229.1 |
| 2015/0341537 A1* | 11/2015 | Peng | H04N 5/2351 | 348/234 |
| 2016/0028985 A1* | 1/2016 | Vogelsang | H01L 27/14641 | 348/294 |
| 2017/0214841 A1* | 7/2017 | Blanquart | H04N 5/35554 | |
| 2018/0027167 A1* | 1/2018 | He | H04N 13/296 | 348/211.1 |

FOREIGN PATENT DOCUMENTS

| | | |
|---|---|---|
| JP | 2014-109853 A | 6/2014 |
| JP | 2015-167340 A | 9/2015 |

\* cited by examiner

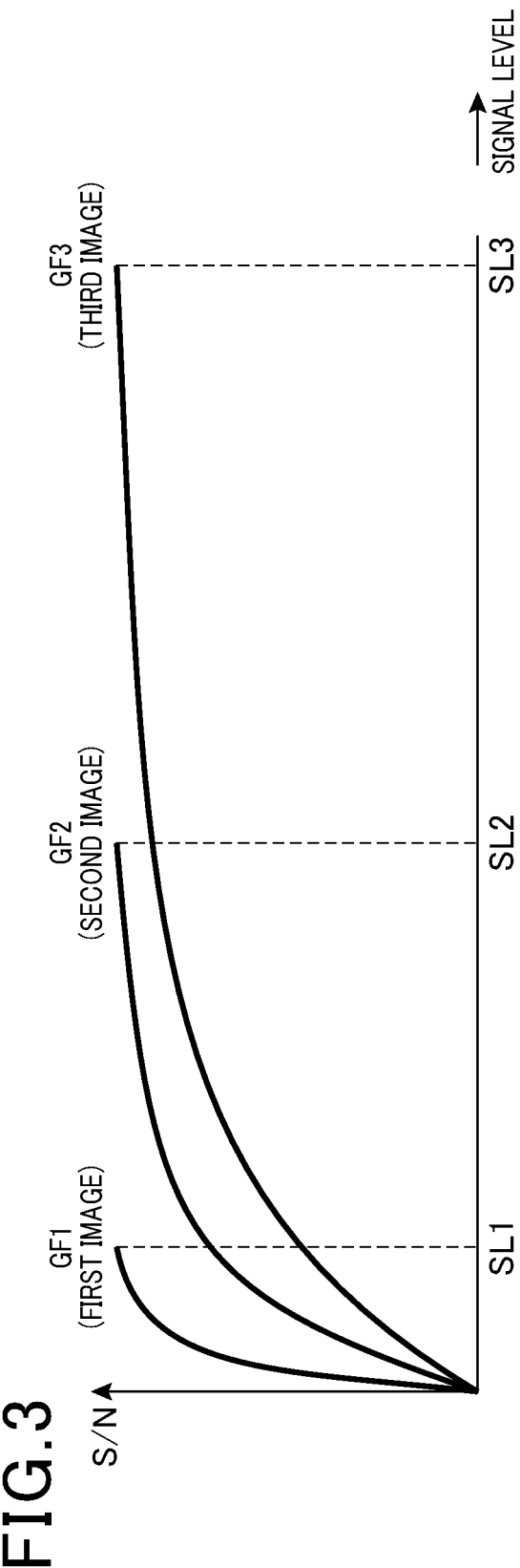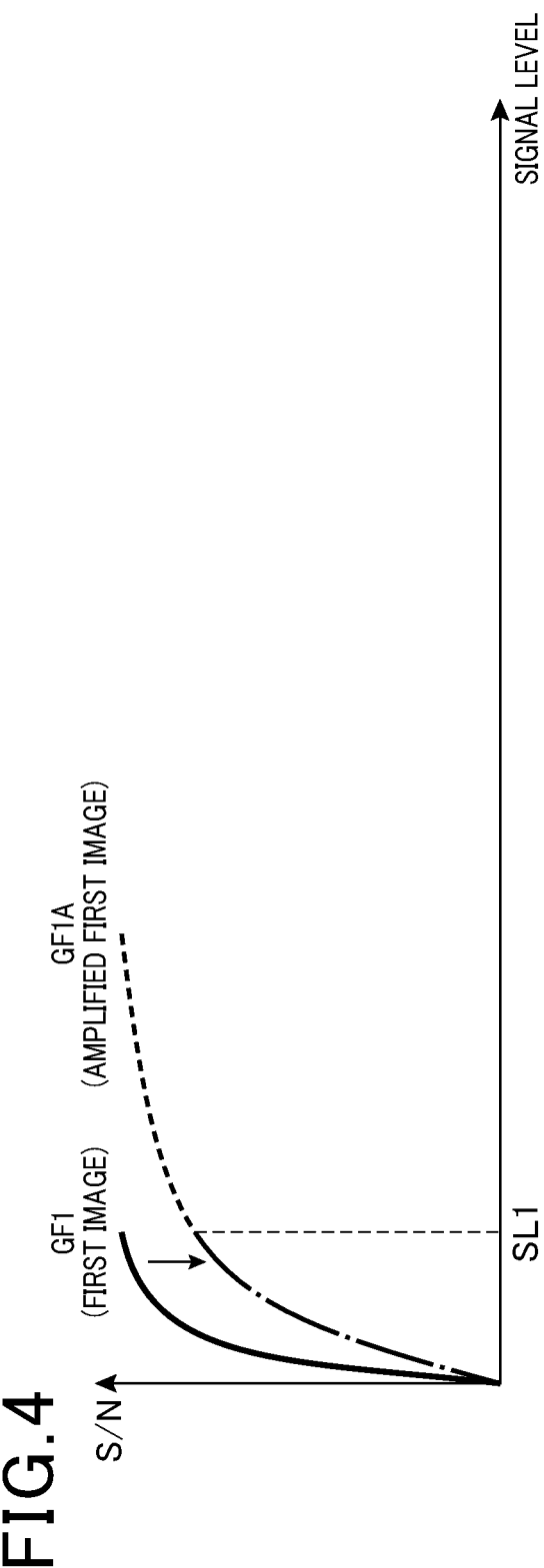

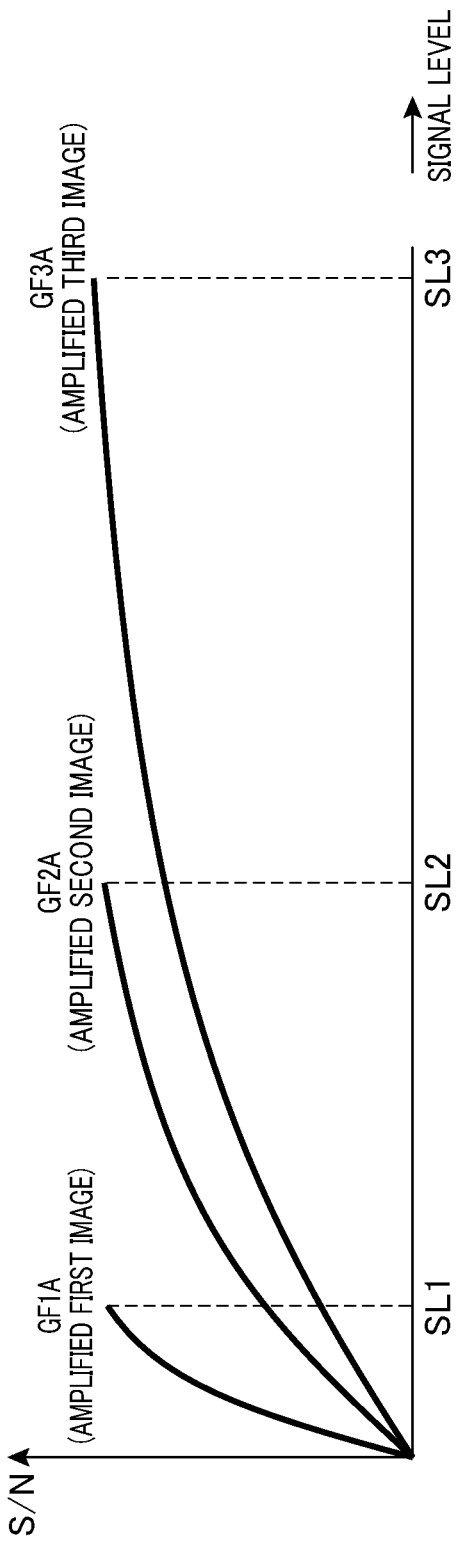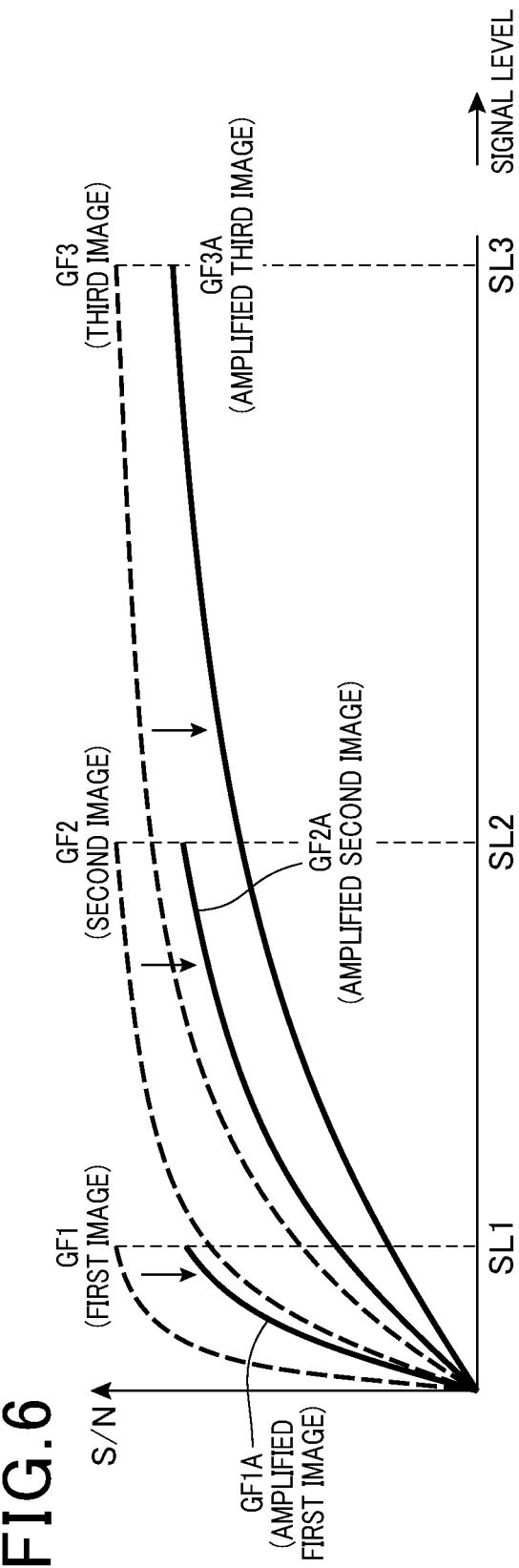

IMAGE GENERATING APPARATUS FOR COMBINING PLURAL IMAGES BASED ON DIFFERENT SHUTTER TIMES

CROSS REFERENCE TO RELATED APPLICATION

This application is based on and claims the benefit of priority from Japanese Patent Application No. 2016-209732 filed on Oct. 26, 2016, the disclosure of which is incorporated in its entirety herein by reference.

TECHNICAL FIELD

The present disclosure relates to image generating apparatuses for combining plural images to thereby generate a composite image; the plural images are captured during respective different shutter times, i.e. exposure times, or captured at respective different shutter speeds.

BACKGROUND

Japanese Patent Application Publication No. 2014-109853 discloses an imaging device having a high dynamic range function (HDR function). The HDR function obtains plural target images, which are captured by an image sensor during respective different shutter times, and combines the plural target images to thereby generate a composite image. The generated composite image has a higher dynamic range.

SUMMARY

A value of each pixel, i.e. a pixel value, of an image captured by an image sensor represents a luminance level, i.e. a luminance value, of the corresponding pixel of the image. A luminance level of each pixel of a first image captured by an image sensor and a luminance level of the corresponding pixel of a second image captured by the same image sensor may be different from each other depending on their ambient environments and/or their shutter times during which the first and second images are respectively captured by the image sensor.

In particular, pixel-to-luminance characteristics of each pixel of a first image captured by an image sensor during a first shutter time are different from pixel-to-luminance characteristics of the corresponding pixel of a second image captured by the same image sensor during a second shutter time; the first shutter time is longer than the second shutter time.

For this reason, for matching the pixel-to-luminance characteristics of each pixel of the second image with the pixel-to-luminance characteristics of the corresponding pixel of the first image or another reason, gains are used.

The gains include an analog gain used to amplify analog pixel values, which are referred to as analog pixel signals, output from the image sensor. The gains also include a digital gain. The HDR function converts the analog pixel values (analog pixel signals) of each of the first and second images into digital pixel values based on a predetermined bit width, i.e. the number of bits; the digital pixel values are referred to as digital pixel signals. Then, the HDR function amplifies the digital pixel values of the second image using the digital gain, and generates a composite image based on the digital pixel values of the first image and the amplified digital pixel values of the second image.

Amplifying digital pixel signals of an image using such a digital gain may result in reduction of the resolution of the image, because, for example, the amplified digital pixel values of some pixels of the image may exceed the predetermined bit width.

For this reason, a typical imaging device amplifies analog pixel signals of an image using an analog gain in priority to amplifying corresponding digital pixel signals of the image using a digital gain. Thereafter, the typical imaging device amplifies one or more digital pixel signals of the image using the digital gain if the levels of the one or more digital pixel signals, which have been amplified based on the analog gain, do not reach a necessary signal level.

Unfortunately, an increase in such an analog gain for amplifying an image may result in reduction of a signal-to-noise ratio (S/N ratio) of the image. For this reason, if the typical imaging device, which amplifies analog pixel signals of an image using an analog gain in priority to amplifying corresponding digital pixel signals of the image using a digital gain, uses the HDR function to generate a composite image, the composite image may have a low S/N ratio. S/N ratio will also be referred to simply as an S/N hereinafter.

In view of the circumstances set forth above, one aspect of the present disclosure seeks to provide image generating apparatuses, which are capable of addressing the problem set forth above.

Specifically, an alternative aspect of the present disclosure aims to provide such image generating apparatuses, each of which is capable of generating, based on plural images captured during respective different shutter times, a composite image with higher S/N ratio.

According to an exemplary aspect of the present disclosure, there is provided an image generating apparatus. The image generating apparatus includes an image unit. The imaging unit is configured to perform, at a current capturing cycle, a capturing task of capturing first and second images based on respective first and second shutter times different from each other, each of the first and second images having an analog pixel value of each pixel thereof. The imaging unit is configured to amplify the analog pixel values of each of the first and second images by an analog gain. The image generating apparatus includes an image combination unit configured to convert the analog pixel values of each of the first and second images into digital pixel values of a corresponding one of the first and second images. The image combination unit is configured to combine the digital pixel values of the first image with the digital pixel values of the second image to thereby generate a composite image having a digital pixel value of each pixel thereof. The image generating apparatus includes an amplifier configured to amplify the digital pixel values of the composite image by a digital gain, and a compression unit. The compression unit is configured to compress the amplified digital pixel values of the composite image in accordance with a predetermined compression characteristic to thereby generate a compressed composite image as an output image. The image generating apparatus includes a setter configured to variably set, for the image capturing task at a next capturing cycle, the first and second shutter times and a total gain, the total gain being based on combination of the analog gain and the digital gain. The image generating apparatus includes an allocating unit. The allocating unit is configured to obtain a threshold gain based on the first and second shutter times and the compression characteristic. The allocating unit is configured to variably allocate the total gain to at least one of the analog gain and the digital gain in accordance with a comparison among the total gain, the threshold gain, and an upper limit for the analog gain.

This configuration of the image generating apparatus properly allocates the total gain to at least one of the digital gain and the analog gain in accordance with the comparison among the total gain, the threshold gain, and the upper limit for the analog gain in contrast to the above typical imaging device. The typical imaging device uses the analog gain in priority to the digital gain independently of the comparison among the total gain, the threshold gain, and the upper limit for the analog gain.

This therefore enables composite images each having higher S/N ratio to be generated.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIG. 3 is a graph representation schematically illustrating first to third graphs respectively representing S/N ratio characteristics according to the present embodiment;

FIG. 4 is a graph representation schematically illustrating S/N ratio characteristics of an amplified first image as compared with the S/N ratio characteristics based on the first graph;

FIG. 5 is a graph representation schematically illustrating S/N ratio characteristics of each of the amplified first to third images according to the present embodiment;

FIG. 6 is a graph representation schematically illustrating the S/N ratio characteristics of the respective amplified first to third images as compared with the S/N ratio characteristics based on the respective first to third graphs;

DETAILED DESCRIPTION OF EMBODIMENT

The following describes a present embodiment of the present disclosure with reference to the accompanying drawings.

The following describes a cruise-assist system 1 according to the present embodiment of the present disclosure with reference to FIGS. 1 to 9.

Figure 1:
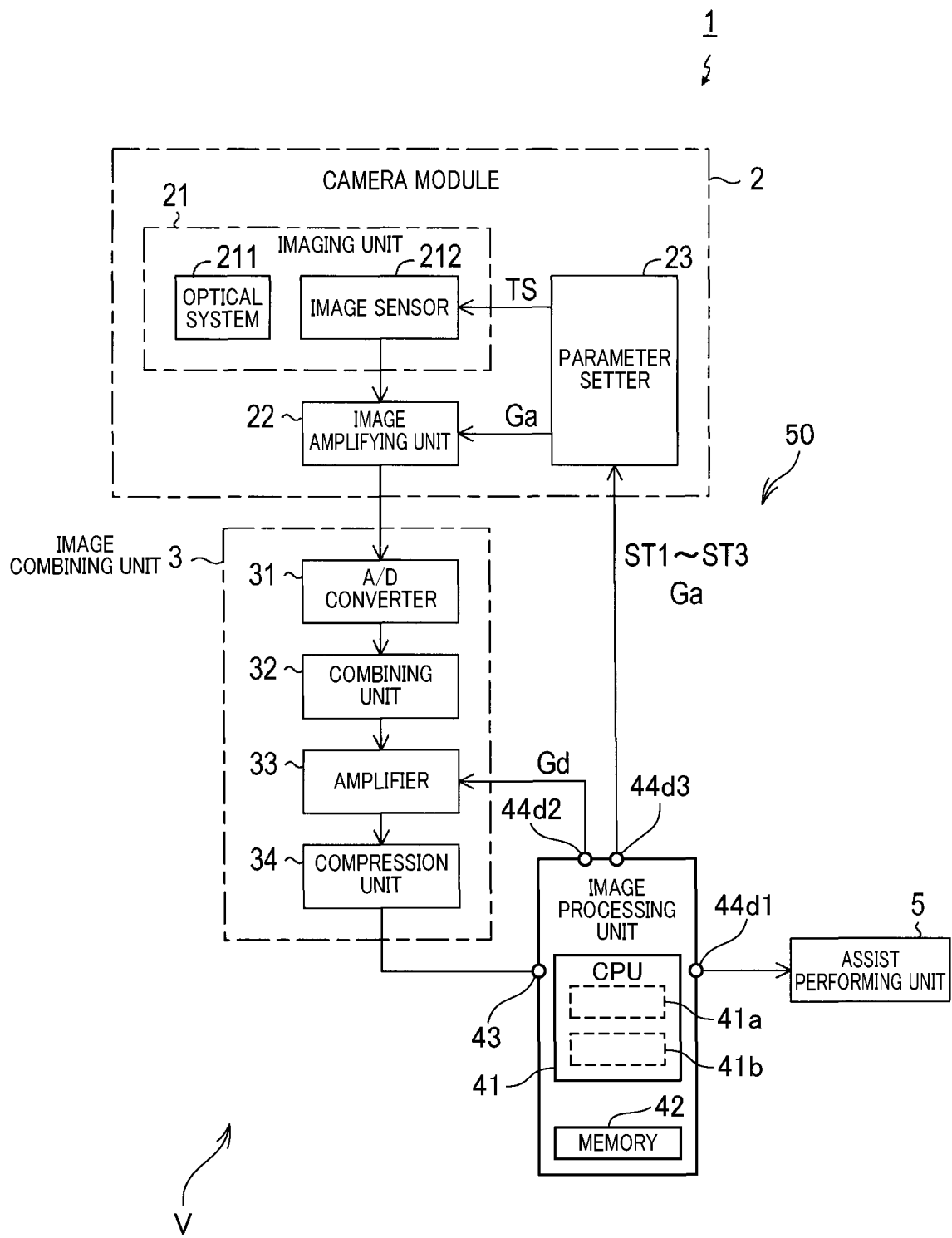
FIG. 1 is a block diagram schematically illustrating an example of the structure of a cruise-control system according to a present embodiment of the present disclosure.

Referring to FIG. 1, the cruise-assist system 1, which is installed in a vehicle V, includes a camera module 2, an image combining unit 3, an image processing unit 4, and an assist performing unit 5. For example, the camera module 2, the image combining unit 3, and the image processing unit 4 constitute an image generating apparatus 50 according to the present embodiment.

The camera module 2 includes an imaging unit 21, an image amplifying unit 22, and a parameter setter 23.

The imaging unit 21 includes an optical system 211 and an image sensor 212. The optical system 211 is comprised of at least one collecting lens and at least one optical filter. The at least one collecting lens is configured to collect light, and the at least one optical filter is configured to pass predetermined components of the collected light therethrough, thus outputting light based on the passed components of the collected light to the image sensor 212.

The image sensor 212 is comprised of light-sensitive elements each including a charge-coupled device (CCD) or a complementary metal-oxide-semiconductor (CMOS) switch; the light-sensitive elements are arranged in a two-dimensional array. Each of the two-dimensionally arranged light-sensitive elements, which serves as a pixel, is configured to receive a corresponding component of the light output from the optical system 211 during a shutter time ST or an exposure time. The two-dimensionally arranged light-sensitive elements constitute an imaging area on which light output from the optical system 211 is received.

Each of the two-dimensionally arranged light-sensitive elements is also configured to convert the intensity or luminance level of the received light component into an analog pixel value or an analog pixel signal, i.e. an analog pixel voltage signal, that is proportional to the luminance level of the received light component.

The shutter time ST during which light is received by the two-dimensionally arranged light-sensitive elements, in other words, during which the two-dimensionally arranged light-sensitive elements are exposed to light, is controllable by the parameter setter 23 described later. The shutter time ST can also be expressed as a shutter speed.

The image amplifying unit 22 is configured to obtain, from the image sensor 212, the pixel signals, i.e. pixel values, each representing the luminance level of the corresponding pixel as an image, i.e. a frame image. Then, the image amplifying unit 22 is configured to amplify the pixel values of the image by a predetermined analog gain Ga variably controllable by the parameter setter 23. Then, the image amplifying unit 22 is configured to output the amplified pixel signals, i.e. amplified pixel values, as an image, i.e. a frame image, to the image combining unit 3.

The parameter setter 23 is configured to variably set a value of the shutter time ST used by the imaging unit 21, and a value of the analog gain Ga used by the image amplifying unit 22.

That is, the imaging unit 21 is configured to capture images, each of which is based on light received by the image sensor 212 during a corresponding value of the shutter time ST set by the parameter setter 23. Additionally, the image amplifying unit 22 is configured to amplify the pixel values of each image sent from the imaging unit 21 using a corresponding value of the analog gain Ga set by the parameter setter 23.

For example, the imaging unit 21 according to the present embodiment performs an image capturing task to capture, for an image capturing cycle, a set of first to third images, i.e. first to third original images during respective first to third different shutter times ST1 to ST3 set by the parameter setter 23. Note that the first shutter time ST1 is set to be longer than the second shutter time ST2, and the second shutter time ST2 is set to be longer than the third shutter time ST3. The imaging unit 21 periodically performs the image capturing cycle to periodically capture the set of first to third images.

In addition, the image amplifying unit 22 according to the present embodiment amplifies the pixel values of each of the first to third images using a value of the analog gain Ga set by the parameter setter 23. Then, the image amplifying unit 22 outputs each of the first to third images amplified thereby to the image combining unit 3.

The image combining unit 3 is comprised of an analog-to-digital (A/D) converter 31, a combining unit 32, an amplifier 33, and a compression unit 34. For example, the image combining unit 3 is designed as an integrated-circuit (IC) chip. The image combining unit 3 can be installed in the camera module 2.

The A/D converter 31 converts the analog pixel signals (analog pixel values) of each of the first to third images into digital pixel signals (digital pixel values) based on a predetermined bit width L, i.e. the number of bits, such as 12 bits.

The combining unit 32 obtains the digitized first to third images from the A/D converter 31, and combines the digitized first to third images to generate an HDR composite image with higher dynamic range. Dynamic range of an image represents a range of contrast of the image.

Because the first shutter time ST1 of the first image is longer than the second shutter time ST2 of the second image, the amount of light received on the imaging area of the imaging sensor 212 for the first image is greater than the amount of light received on the imaging area of the imaging sensor 212 for the second image.

Similarly, because the second shutter time ST2 of the second image is longer than the third shutter time ST3 of the third image, the amount of light received on the imaging area of the imaging sensor 212 for the second image is greater than the amount of light received on the imaging area of the imaging sensor 212 for the third image. For this reason, the longer the shutter time ST during which an image is captured, the higher the resolution of low luminance values of the image. Additionally, the average signal level of an image changes with change of the shutter time ST during which the image is captured.

That is, because the average signal level of the first image is greater than the average signal level of the second image, the combining unit 32 amplifies the digital pixel values of the second image by a first digital gain to thereby match the digital pixel value of each pixel of the second image with the digital pixel value of the corresponding pixel of the first image.

Similarly, because the average signal level of the first image is greater than the average signal level of the third image, the combining unit 32 amplifies the digital pixel values of the third image by a second digital gain to thereby match the digital pixel value of each pixel of the third image with the digital pixel value of the corresponding pixel of the first image.

After the amplifying operation, the combining unit 32 combines the digital pixel value of each pixel of the first image, the amplified digital pixel value of the corresponding pixel of the second image, and the amplified digital pixel value of the corresponding pixel of the third image. This combination generates an HDR composite image having a digital pixel value of each pixel representing a luminance level of the corresponding pixel; the bit width of the digital pixel value of each pixel of the HDR composite image is set to M bits, such as 16 bits, which is greater than the bit width L, such as 12 bits, of each of the first to third images.

The amplifier 33 receives the HDR composite image sent from the combining unit 32. Then, the amplifier 213 amplifies the digital pixel values of the HDR composite image by a digital gain Gd determined by the image processing unit 4. That is, the digital pixel value of each pixel of the HDR composite image has M bits, such as 16 bits, and the luminance level of each pixel and the digital pixel value of the corresponding pixel in the HDR composite image have, for example, a linear relationship therebetween. The digital gain Gd is determined independently from the first and second digital gains used by the combining unit 32.

The compression unit 34 compresses the HDR composite image having the digital pixel value of each pixel represented by the bit width of M bits to thereby generate a compressed HDR composite image having a digital pixel value of each pixel represented by a bit width of N bits, such as 8 bits, smaller than the M bits. That is, the luminance level of each pixel and the digital pixel value of the corresponding pixel in the compressed HDR composite image have a non-linear relationship therebetween. The compressed HDR composite image will also be referred to as an output HDR-composite image.

In particular, the compression unit 34 compresses the HDR composite image in accordance with predetermined compression characteristics stored therein. An example of the compression characteristics is illustrated in FIG. 2 as a graph format.

Figure 2:
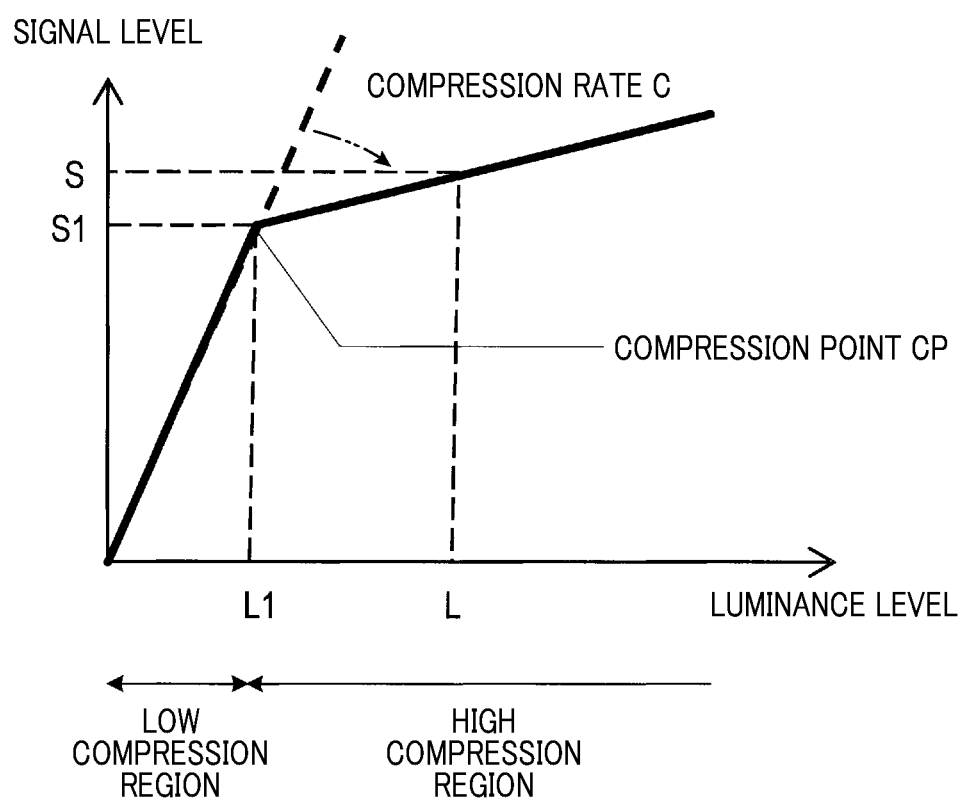
FIG. 2 is a graph representation illustrating an example of compression characteristics used by a compression unit illustrated in FIG. 1.

Specifically, the compression characteristics illustrated in FIG. 2 have

1. A predetermined first compression rate for the luminance level of a pixel of the HDR composite image being within a predetermined low compression region that is defined to be lower than a predetermined luminance level L1

2. A predetermined second compression rate for the luminance level of a pixel of the HDR composite image being within a predetermined high compression region that is defined to be equal to or higher than the predetermined luminance level L1; the second compression rate is higher than the first compression rate In other words, a compression rate C of the compression characteristics is changed from the first compression rate to the second compression rate at the luminance level L1; the luminance level L1 will be referred to as a compression point CP.

The present embodiment uses 1 as the first compression rate. That is, the low compression region represents a no-compression region within which the luminance levels of the HDR composite image are not compressed.

To sum up, the image combining unit 3 is configured to generate, based on the set of first to third images supplied from the imaging unit 21 at each current image capturing cycle, an HDR composite image, and supply the HDR composite image to the image processing unit 4.

The image processing unit 4 is configured mainly as at least one known microcomputer including a CPU 41, a memory device 42, an input port 43, and output ports 44d1, 44d2, and 44d3. The memory device 42 includes, for example, at least one of semiconductor memories, such as a RAM, a ROM, and a flash memory. These semiconductor memories are for example non-transitory storage media.

The input port 43 is communicable with the image combining unit 3 by wire or wireless. The output port 44d1 is communicable with the assist performing unit 5 by wire or wireless, and the output port 44d2 is communicable with the image combining unit 3 by wire or wireless. The output port 44d3 is also communicable with the camera module 2 by wire or wireless.

For example, the CPU 41 of the image processing unit 4 can run one or more programs, i.e. sets of program instructions, stored in the memory device 42, thus implementing various functional modules of the image processing unit 4 as software operations. In other words, the CPU 41 can run programs stored in the memory device 42, thus performing one or more routines in accordance with the corresponding one or more programs.

For example, the CPU 41 according to the first embodiment is programmed to perform at least a target-object detection routine and a parameter adjustment routine in a predetermined control cycle. In other words, the CPU 41 functionally includes, for example, at least a target-object detection unit 41a and a parameter adjustment unit 41b, which are implemented by, for example, the respective target-object detection routine and parameter adjustment routine.

The above routines and/or the various functions of the image processing unit 4 can be implemented as a hardware electronic circuit. For example, the various functions of the image processing unit 4 can be implemented by a combination of electronic circuits including digital circuits, which include many logic gates, analog circuits, digital/analog hybrid circuits, or hardware/software hybrid circuits.

Plural microcomputers can constitute the image processing unit 4.

The target-object detection routine, which is a known routine, is configured to detect, based on an HDR composite image supplied from the image combining unit 3 at each image capturing cycle, various target objects contained in the HDR composite image, and generate target object information indicative of each of the detected target objects. The target objects to be detected by the target-object detection routine include, for example, road markers, such as white lines, painted on roads, road signs, preceding vehicles, pedestrians, and obstacles. The target-object information for a target object includes, for example, the relative position of the target object relative to the own vehicle, and the relative speed of the target object relative to the own vehicle.

The parameter adjustment routine is configured to adjust, based on an HDR composite image supplied from the image combining unit 3 at each image capturing cycle, a value of each of the shutter times ST1 to ST3, a value of the analog gain Ga, and a value of the digital gain Gd as image capturing parameters used for the next image capturing cycle. The detailed information about the parameter adjustment routine will be described later.

The assist performing unit 5 is configured to control, based on the target-object information generated by the target-object detection routine of the image processing unit 4, various devices installed in the own vehicle to thereby perform predetermined cruise assist tasks. The devices to be controlled by the assist performing unit 5 include, for example, a display for displaying various images, a sound device for outputting an alarm and/or a guide sound, an internal combustion engine, a power train, and/or a brake mechanism. For example, the cruise assist tasks include 1. A lane-keeping assist task for keeping the own vehicle in a current travelling lane
2. A cruise-control task for controlling the speed of the own vehicle as a function of, for example, the distance between the own vehicle and a preceding vehicle
3. A brake assist task for assisting the braking of the own vehicle
4. A task for outputting various warnings Next, the following describes the relationships among signal-to-noise ratio (S/N ratio) characteristics of each of the first to third images, the analog gain Ga, and digital gain Gd.

The S/N ratio characteristics representing the relationships between a signal level distribution of the first image and the S/N ratio show that the S/N ratio monotonically increases as the signal level increases from low to high in the signal level distribution. The S/N ratio characteristics of each of the other second and third images are identical to the S/N ratio characteristics of the first image.

Additionally, the S/N ratio of the first image is saturated at a signal level SL1 lower than a signal level SL2 of the second image at which the S/N ratio for the second image is saturated, because the amount of light received on the imaging area of the imaging sensor 212 for the first image is greater than the amount of light received on the imaging area of the imaging sensor 212 for the second image. Similarly, the S/N ratio of the second image is saturated at the signal level SL2 lower than a signal level SL3 of the third image at which the S/N ratio of the third image is saturated, because the amount of light received on the imaging area of the imaging sensor 212 for the second image is greater than the amount of light received on the imaging area of the imaging sensor 212 for the third image.

FIG. 3 illustrates, as a graph GF1, an example of the above relationship between a signal level distribution of the first image output from the image sensor 212 and the S/N ratio characteristics of the first image. Similarly, FIG. 3 illustrates, as respective graphs GF2 and GF3, an example of the relationship between a signal level distribution of the second image output from the image sensor 212 and the S/N ratio characteristics of the second image, and an example of the relationship between a signal level distribution of the third image output from the image sensor 212 and the S/N ratio characteristics of the third image.

Note that the graph GF2 represents the S/N ratio characteristics of the second image whose averaged signal levels are matched with the averaged signal levels of the first image, and the graph GF3 represents the S/N ratio characteristics of the third image whose averaged signal levels are matched with the averaged signal levels of the first image In each of the graphs, the vertical axis represents the S/N ratio and the horizontal axis represents the signal level.

The image amplifying unit 22 amplifies, by the analog gain Ga, the first image whose S/N ratio characteristics are illustrated as the graph GF1 in FIG. 3, thus obtaining S/N ratio characteristics whose graph is illustrated as GF1A in FIG. 4.

Specifically, FIG. 4 illustrates the S/N ratio characteristics GF1A of the amplified first image as compared with the S/N ratio characteristics GF1.

Amplifying the first image by the analog gain Ga means that both signal components and noise components included in the analog pixel signals of the first image are amplified. This amplification results in the S/N ratio characteristics GF1 of the first image being enlarged in the horizontal direction, i.e. a signal-level increasing direction, to have the shape of the S/N ratio characteristics GF1A.

At that time, because the signal level L1 at which the corresponding S/N is saturated is kept unchanged, the S/N of the S/N ratio characteristics GF1A is saturated at the same signal level SL1. This results in the S/N ratio characteristics GF1A appearing to be lower than the S/N ratio characteristics GF1 of the first image.

Similarly, the image amplifying unit 22 amplifies, by the analog gain Ga, the second and third image whose respective S/N ratio characteristics are illustrated as the graphs GF2 and GF3 in FIG. 3, thus obtaining S/N ratio characteristics whose respective graphs are illustrated as GF2A and GF3A in FIG. 5.

That is, FIG. 5 illustrates all the S/N ratio characteristics GF1A, GF2A, and GF3A.

In addition, FIG. 6 illustrates
1. The S/N ratio characteristics GF1A of the amplified first image as compared with the S/N ratio characteristics GF1 (see corresponding dashed line)
2. The S/N ratio characteristics GF2A of the amplified second image as compared with the S/N ratio characteristics GF2 (see corresponding dashed line)
3. The S/N ratio characteristics GF3A of the amplified third image as compared with the S/N ratio characteristics GF3 (see corresponding dashed line)

That is, the S/N of the S/N ratio characteristics GF2A is saturated at the same signal level SL2, and the S/N of the S/N ratio characteristics GF3A is saturated at the same signal level SL3, which is identical to the S/N of the S/N ratio characteristics GF1A set forth above. This results in
1. The S/N ratio characteristics GF1A appearing to be lower than the S/N ratio characteristics GF1 of the first image
2. The S/N ratio characteristics GF2A appearing to be lower than the S/N ratio characteristics GF2 of the second image
3. The S/N ratio characteristics GF3A appearing to be lower than the S/N ratio characteristics GF3 of the third image To simplify the following descriptions, the S/N ratio characteristics of the digitized first image correspond to the S/N ratio characteristics GF1A illustrated in FIG. 6. Similarly, the S/N ratio characteristics of the digitized second image correspond to the S/N ratio characteristics GF2A illustrated in FIG. 6, and the S/N ratio characteristics of the digitized third image correspond to the S/N ratio characteristics GF3A illustrated in FIG. 6.

Specifically, the combining unit 32 combines the digitized first to third images to generate an HDR composite image.

Figure 7:
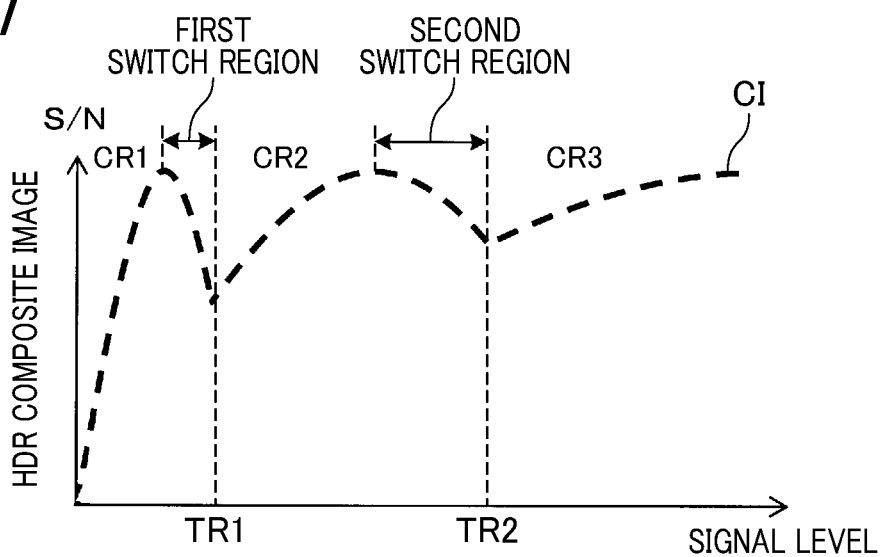
FIG. 7 is a graph representation schematically illustrating a graph of an HDR composite image generated by a combining unit illustrated in FIG. 1.

FIG. 7 illustrates a graph CI of the HDR composite image generated by the combining unit 32 using a dashed line. The graph CI of the S/N ratio characteristics of the HDR composite image has first to third continuous local crests CR1, CR2, and CR3 corresponding to the respective first, second, and third images. The adjacent local crests CR1 and CR2 provide a first trough TR1 therebetween, and the adjacent local crests CR2 and CR3 provide a second trough TR2 therebetween.

The following describes why the S/N ratio characteristics of the HDR composite image have the waveform having first to third continuous local crests CR1, CR2, and CR3 corresponding to the respective first, second, and third images.

For example, for each pixel of the HDR composite image, the combining unit 32 is configured to
1. Select one of the digital pixel value of the corresponding pixel of the first image, the digital pixel value of the corresponding pixel of the second image, and the digital pixel value of the corresponding pixel of the third image or
2. Merge at least two of the digital pixel value of the corresponding pixel of the first image, the digital pixel value of the corresponding pixel of the second image, and the digital pixel value of the corresponding pixel of the third image For example, the combining unit 32 is configured to
1. Select the digital pixel value of the first image for a low luminance level portion of the HDR composite image
2. Merge the digital pixel value of the first image and the digital pixel value of the second image for a boundary portion between the low luminance level portion and a middle luminance level portion of the HDR composite image
3. Select the digital pixel value of the second image for the middle luminance level portion of the HDR composite image
4. Merge the digital pixel value of the second image and the digital pixel value of the third image for a boundary portion between the middle luminance level portion and a high luminance level portion of the HDR composite image
5. Select the digital pixel value of the third image for the high luminance level portion of the HDR composite image This results in the graph CI of the S/N ratio characteristics of the HDR composite image having
1. A first switch region from the first local crest CR1 to the first trough TR1
2. A second switch region from the second local crest CR2 to the second trough TR2

Figure 8:
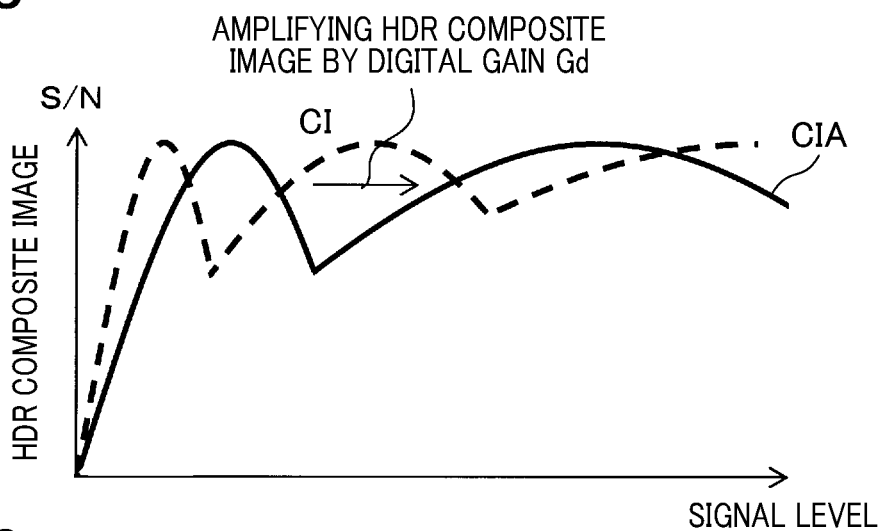
FIG. 8 is a graph representation schematically illustrating S/N ratio characteristics of an amplified HDR composite image as compared with the S/N ratio characteristics illustrated in FIG. 7.

The amplifier 33 amplifies, by the digital gain Gd, the HDR composite image whose S/N ratio characteristics are illustrated as the graph CI in FIG. 8, thus obtaining S/N ratio characteristics whose graph is illustrated as CIA in FIG. 8.

Specifically, FIG. 8 illustrates the S/N ratio characteristics CIA of the amplified HDR composite image as compared with the S/N ratio characteristics CI.

Amplifying the HDR composite image by the digital gain Gd means that both signal components and noise components included in the digital pixel signals of the HDR composite image are amplified. This amplification results in the S/N ratio characteristics CI of the HDR composite image being enlarged in the horizontal direction to have the shape of the S/N ratio characteristics CIA (see FIG. 8).

Next, the following describes how the compression unit 34 compresses the HDR composite image.

A signal level S corresponding to a luminance level L in the high compression region of the HDR composite image, which is higher than the predetermined level L1, is expressed by the following equation (1):

$$S=(L-L1) \times C+S1 \tag{1}$$

Where C represents the second compression rate for the luminance level of a pixel of the HDR composite image being within the high compression region, which is set to, for example, $\frac{1}{8}$ or $\frac{1}{16}$.

A value SR [dB] of the S/N ratio for the luminance level of a pixel of the HDR composite image being within the low compression region, that is, the no compression region, is expressed by the following equation (2), and a value SR [dB] of the S/N ratio for the luminance level of a pixel of the HDR composite image being within the high compression region is expressed by the following equation (3):

$$SR[\text{dB}] = 20\log10\left(\frac{S}{N}\right) \quad (2)$$

$$SR[\text{dB}] = 20\log10\left(\frac{(L-L1)\times C + S}{N \times C}\right) \quad (3)$$

That is, luminance components of pixels within the high compression region are compressed by the compression rate C so as to be added to the luminance level L1 while noise components of the pixels are simply compressed. This results in the S/N ratio characteristics of the HDR composite image within the high compression region being extremely higher than the S/N ratio characteristics of the HDR composite image within the low compression region.

Figure 9:
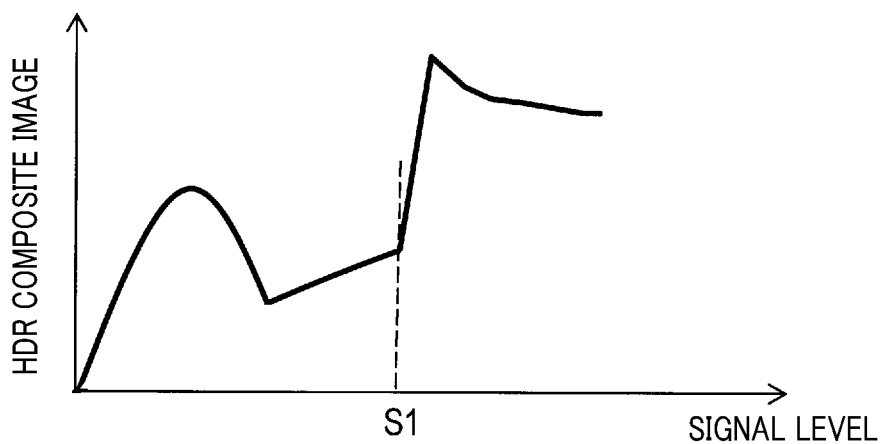
FIG. 9 is a graph representation schematically illustrating an example of a graph representing S/N ratio characteristics of a compressed HDR composite image.

FIG. 9 schematically illustrates an example of a graph COG representing the S/N ratio characteristics of the compressed HDR composite image, i.e. the output HDR-composite image, generated by compressing the HDR composite image (whose S/N ratio characteristics CIA are illustrated in FIG. 8) by the compression unit 34.

Although the horizontal and vertical scales of the graph in FIG. 9 are different from those of the graph in FIG. 8, the S/N ratio characteristics COG of the compressed HDR composite image, which are lower than the signal level S1 corresponding to the luminance level L1, i.e. the compression point CP, are substantially identical to the S/N ratio characteristics CIA of the HDR composite image. In contrast, the S/N ratio characteristics COG of the compressed HDR composite image, which are equal to or higher than the signal level S1, extremely rise based on the effects of the compression by the compression unit 34.

Figure 10:
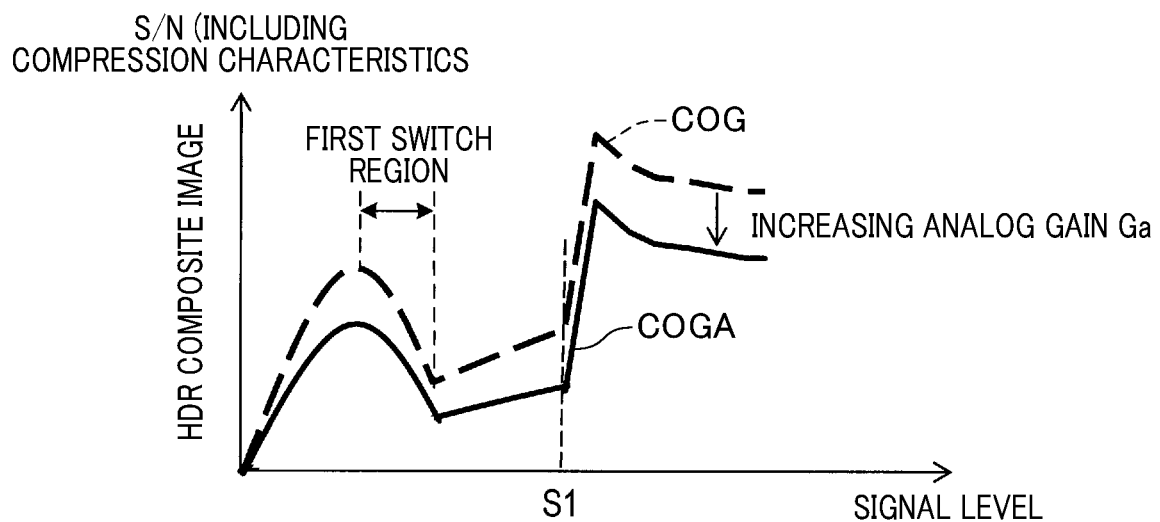
FIG. 10 is a graph representation schematically illustrating change of the S/N ratio characteristics of the compressed HDR composite image when the analog gain is increased.

At that time, increasing the analog gain Ga results in the S/N ratio characteristics COG of the compressed HDR composite image falling down to S/N ratio characteristics COGA of the compressed HDR composite image (see FIG. 10) for the same reason as described in FIGS. 4 and 6.

In addition, increasing the digital gain Gd results in

1. The S/N ratio characteristics COG of the compressed HDR composite image within the low compression region extending in the horizontal direction to have S/N ratio characteristics COGB (see FIG. 11)

2. The S/N ratio characteristics COG of the compressed HDR composite image within the high compression region to drastically increase to have the S/N ratio characteristics COGB (see FIG. 11)

Figure 11:
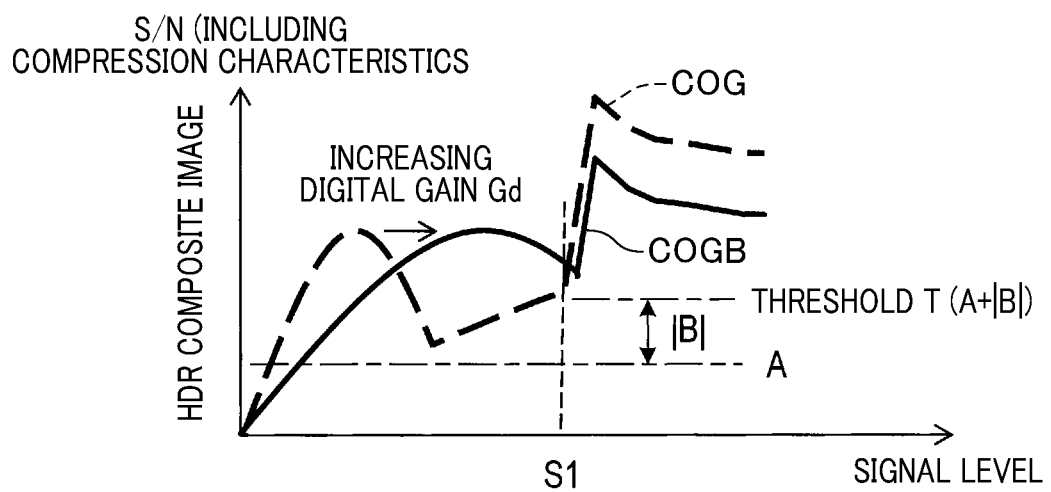
FIG. 11 is a graph representation schematically illustrating change of the S/N ratio characteristics of the compressed HDR composite image when the digital gain is increased.

Hereinafter, a lower limit of the S/N required for the HDR composite image, i.e. the compressed HDR composite image, generated by the image combining unit 3 is defined as A, and an amount of decrease in the S/N when a current value of the analog gain Ga is changed to a predetermined upper limit Gu is defined as B (see FIG. 11).

In addition, a value of the digital gain Gd, which is required to ensure a value of the S/N of the HDR composite image at the compression point CP whose signal level S1 is located within the first switch region to be higher than a threshold T, is defined as a threshold gain Gth; the threshold T is expressed by "A+|B|".

In other words, when the digital gain Gd is set to the threshold gain Gth, the threshold gain Gth is determined such that 1. The signal level S1 of the compression point CP is located within the first switch region 2. The S/N of the HDR composite image at the compression point CP is equal to or higher than the threshold T, i.e. the value (A+|B|)

Figure 12:
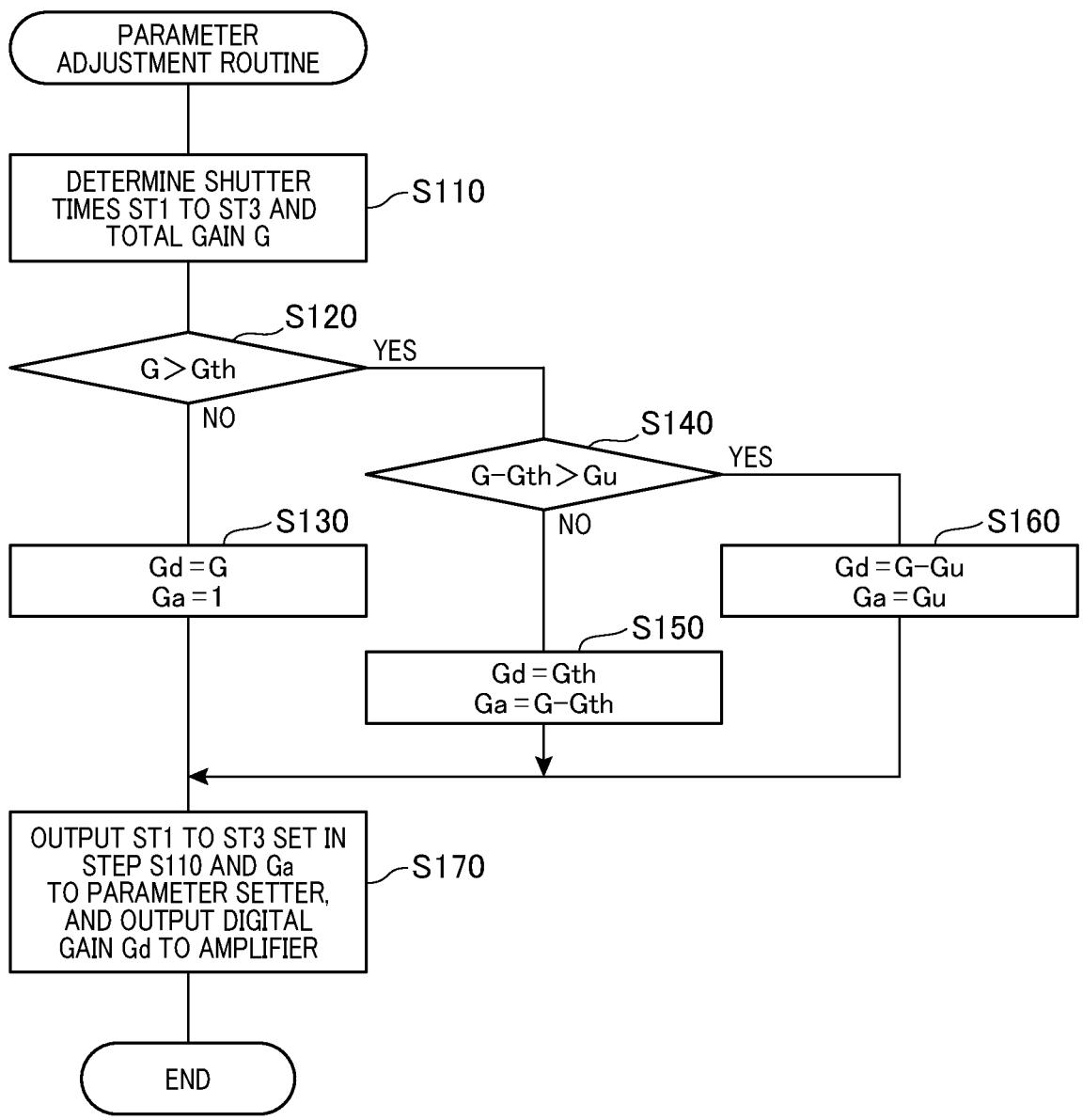
FIG. 12 is a flowchart schematically illustrating an example of a parameter adjustment routine carried out by an image processing unit illustrated in FIG. 1.

Next, the following describes the parameter adjustment routine carried out by the image processing unit 4 with reference to FIG. 12.

The parameter adjustment routine is programmed to be started each time the image processing unit 4 receives the output HDR composite-image output from the image combining unit 3 at a current image capturing cycle.

When the parameter adjustment routine is started at the current image capturing cycle, the image processing unit 4 determines respective values of the image capturing parameters including the shutter times ST1 to ST3 and a total gain G for the next image capturing cycle in step S110; the total gain G is defined based on combination of the analog gain Ga and the digital gain Gd, for example, based on the product of the analog gain Ga and the digital gain Gd, which is expressed by the equation G=Gd×Ga, or the sum of the analog gain Ga and the digital gain Gd, which is expressed by the equation G=Gd+Ga.

For example, the image processing unit 4 calculates an averaged digital pixel value of all the digital pixels values of the output HDR composite-image at the current image capturing cycle, and determines, based on the averaged digital pixel value, values of the shutter times ST1 to ST3 and the total gain G for the next image capturing cycle in step S110.

For a specific example, the image processing unit 4 compares the calculated averaged digital pixel value of all the digital pixels values of the output HDR composite-image at the current image capturing cycle with a predetermined target digital pixel value in step S110. Then, the image processing unit 4 determines, based on the comparison result, values of the shutter times ST1 to ST3 and the total gain G for the next image capturing cycle in step S110.

For example, if the calculated averaged digital pixel value of the output HDR composite-image at the current image capturing cycle is substantially half the target digital pixel value, the image processing unit 4 determines values of the shutter times ST1 to ST3 for the next image capturing cycle to be doubled from the values of the shutter times ST1 to ST3 for the next image capturing cycle at the current image capturing cycle, or determines a value of the total gain G for the next image capturing cycle to be doubled from the value of the total gain G at the current image capturing cycle in step S110.

Following the operation in step S110, the image processing unit 4 determines whether the total gain G is higher than the threshold gain Gth in step S120. Upon determination that the total gain G is equal to or lower than the threshold gain Gth (NO in step S120), the parameter adjustment routine proceeds to step S130. Otherwise, upon determination that the total gain G is higher than the threshold gain Gth (YES in step S120), the parameter adjustment routine proceeds to step S140.

In step S130, the image processing unit 4 sets the digital gain Gd to the total gain G, and sets the analog gain Ga to 1 in step S130, and thereafter, the parameter adjustment routine proceeds to step S170.

In contrast, in step S140, the image processing unit 4 subtracts the threshold gain Gth from the total gain G to thereby obtain a residual gain, i.e. a first excess gain, (G−Gth). Then, in step S140, the image processing unit 4 determines whether the residual gain (G−Gth) is higher than the upper limit Gu.

Upon determination that the residual gain (G−Gth) is equal to or lower than the upper limit Gu (NO in step S140), the parameter adjustment routine proceeds to step S150. Otherwise, upon determination that the residual gain (G−Gth) is higher than the upper limit Gu (YES in step S140), the parameter adjustment routine proceeds to step S160.

In step S150, the image processing unit 4 allocates the threshold gain Gth in the total gain G to the digital gain Gd, and allocates the residual gain (G−Gth) to the analog gain Ga. Thereafter, the parameter adjustment routine proceeds to step S170.

In step S160, the image processing unit 4 allocates the upper limit Gu in the total gain G to the analog gain Ga, and allocates the remaining gain, i.e. a second excess gain, which is expressed by (G−Gu), to the digital gain Gd. Thereafter, the parameter adjustment routine proceeds to step S170.

In step S170, the image processing unit 4 sends, to the parameter setter 23, the values of the respective shutter times ST1 to ST3 set in step S110, and sends, to the parameter setter 23, the value of the analog gain Ga set in one of steps S120, S150, and S160. In step S170, the image processing unit 4 sends, to the amplifier 33, the value the digital gain Gd set in one of steps S120, S150, and S160. Thereafter, the image processing unit 4 terminates the parameter adjustment routine.

The parameter setter 23 sends the values of the first to third shutter times ST1 to ST3 to the image sensor 212, so that the image sensor 212 is going to capture, at the next image capturing cycle, 1. A first image during the value of the first shutter time ST1 sent from the parameter setter 23

2. A second image during the value of the second shutter time ST2 sent from the parameter setter 23

3. A third image during the value of the third shutter time ST3 sent from the parameter setter 23

The parameter setter 23 also sends the value of the analog gain Ga to the image amplifying unit 22, so that the image sensor 212 is going to amplify the analog pixel values of each of the first to third images captured at the next image capturing cycle by the value of the analog gain Ga sent from the parameter setter 23.

Additionally, the amplifier 33 is going to amplify digital pixel values of an HDR composite image based on the first to third images captured at the next image capturing cycle by the value of the digital gain Gd sent from the image processing unit 4.

As described in detail above, the image generating apparatus 50 according to the present embodiment is configured to allocate, at a current image capturing cycle, the total gain G for first to third images to be captured at the next image capturing cycle to the digital gain Gd in priority to the analog gain Ga until the total gain G is equal to or lower than the threshold gain Gth (see steps S120 and S130).

The image generating apparatus 50 is also configured to allocate, at a current image capturing cycle, a part of the total gain G, which is higher than the threshold gain Gth, to the analog gain Ga in priority to the digital gain Gd until the analog gain Ga reaches the upper limit Gu (see steps S140 and S150). Additionally, the image generating apparatus 50 is configured to allocate, at a current image capturing cycle, a part of the total gain G, which is higher than the threshold gain Gth, to the digital gain Gd in priority to the analog gain Ga after the analog gain Ga has reached the upper limit Gu (see steps S140 and S160).

These configurations of the image generating apparatus 50 allocate 1 to the analog gain Ga until the total gain G is equal to or lower than the threshold gain Gth, thus preventing the S/N of the output HDR-composite image from decreasing due to an increase of the analog gain Ga while maintaining the S/N of the output HDR-composite image to be higher than the lower limit A.

If the total gain G is higher than the threshold gain Gth, these configurations of the image generating apparatus 50 allocate the threshold gain Gth to the digital gain Gd and the residual gain (G−Gth) to the analog gain Ga until the residual gain (G−Gth) is equal to or lower than the upper limit Gu. This prevents an increase of the analog gain Ga while maintaining the S/N of the output HDR-composite image to be higher than the lower limit A even if the total gain G is higher than the threshold gain Gth.

If the residual gain (G−Gth) is higher than the upper limit Gu, these configurations of the image generating apparatus 50 assign or allocate the upper limit Gu to the analog gain Ga and the remaining gain (G−Gu) to the digital gain Gd. This prevents the S/N of the output HDR-composite image from decreasing to be lower than the lower limit A.

These configurations therefore achieve output HDR-composite images each having higher S/N, thus improving the accuracy of cruise-assist control to be carried out based on information obtained from the achieved output HDR-composite images.

The present disclosure is not limited to the descriptions of the present embodiment, and the descriptions of the present embodiment can be widely modified within the scope of the present disclosure.

The functions of one element in the present embodiment can be distributed as plural elements, and the functions that plural elements have can be combined into one element. At least part of the structure of the present embodiment can be replaced with a known structure having the same function as the at least part of the structure of the present embodiment. A part of the structure of the present embodiment can be eliminated. All aspects included in the technological ideas specified by the language employed by the claims constitute embodiments of the present invention.

The present disclosure can be implemented by various embodiments in addition to the image generating apparatus; the various embodiments include systems each including the image generating apparatus, programs for serving a computer as an allocating unit, storage media storing the programs, and image generating methods.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An image generating apparatus comprising:
    an image unit configured to:
        perform, at a current capturing cycle, a capturing task of capturing first and second images based on respective first and second shutter times different from each other, each of the first and second images having an analog pixel value of each pixel thereof; and
        amplify analog pixel values of each of the first and second images by an analog gain;
    an image combination unit configured to:

convert the analog pixel values of each of the first and second images into digital pixel values of a corresponding one of the first and second images; and combine the digital pixel values of the first image with the digital pixel values of the second image to thereby generate a composite image having a digital pixel value of each pixel thereof;

an amplifier configured to amplify the digital pixel values of the composite image by a digital gain;

a compression unit configured to compress the amplified digital pixel values of the composite image in accordance with a compression characteristic, which is predetermined, to thereby generate a compressed composite image as an output image;

a setter configured to variably set, for the capturing task at a next capturing cycle, the first and second shutter times and a total gain, the total gain being based on combination of the analog gain and the digital gain; and an allocating unit configured to:
obtain a threshold gain based on the first and second shutter times and the compression characteristic; and
variably allocate the total gain to at least one of the analog gain and the digital gain in accordance with a comparison among the total gain, the threshold gain, and an upper limit for the analog gain.

2. The image generating apparatus according to claim 1, wherein the allocating unit is configured to:

determine whether the total gain is equal to or lower than the threshold gain;

allocate all the total gain to the digital gain upon determination that the total gain is equal to or lower than the threshold gain; and determine whether the total gain is equal to or lower than the upper limit for the analog gain upon determination that the total gain is higher than the threshold gain;

allocate the threshold gain in the total gain to the digital gain, and a first excess gain in the total gain to the analog gain upon determination that the total gain is equal to or lower than the upper limit for the analog gain, the first excess gain exceeding the threshold gain; and allocate the upper limit for the analog gain in the total gain to the analog gain, and a second excess gain to the digital gain upon determination that the total gain is higher than the upper limit for the analog gain, the second excess gain being higher than the upper limit for the analog gain.

3. The image generating apparatus according to claim 2, wherein:

the compression characteristic is configured such that:

a first luminance level region lower than a compression point having a predetermined luminance level has a first compression rate; and a second luminance level region equal to or higher than the compression point has a second compression rate;

the first shutter time is set to be longer than the second shutter time;

a signal-to-noise ratio characteristic of the composite image includes a first region based on corresponding digital pixel values of the first image, a second region based on corresponding digital pixel values of the second image, and a switch region between the first and second regions, the switch region being based on at least one of corresponding digital pixel values of the first image and corresponding digital pixel values of the second image, a signal-to-noise ratio in the switch region decreasing with an increase of a corresponding signal component in the switch region; and the threshold gain is configured such that, in response to the digital gain being set to the threshold gain, the compression point is located within the switch region, and the signal-to-noise ratio of the composite image at the compression point is set to be equal to or higher than a sum of:
an absolute value of an amount of decrease in the signal-to-noise ratio of the composite image in response to the analog gain being allocated to the upper limit; and
a lower limit of the signal-to-noise ratio required for the composite image.

4. The image generating apparatus according to claim 1, wherein the image combination unit is further configured to amplify digital pixel values of the second image by a combination digital gain to match the digital pixel value of each pixel in the second image with a digital pixel value of a corresponding pixel of the first image, wherein the combination digital gain is determined independently from the digital gain.

5. The image generating apparatus according to claim 1, wherein the analog gain to amplify the analog pixel values of each of the first and second images is received from the allocating unit upon being variably allocated from the total gain.

6. The image generating apparatus according to claim 1, wherein the digital gain to amplify the digital pixel values of the composite image at the amplifier is received from the allocating unit upon being variably allocated from the total gain.

* * * * *